United States Patent [19]

Roberts

[11] Patent Number: 4,722,055
[45] Date of Patent: * Jan. 26, 1988

[54] METHODS AND APPARATUS FOR FUNDING FUTURE LIABILITY OF UNCERTAIN COST

[75] Inventor: Peter A. Roberts, New York, N.Y.

[73] Assignee: College Savings Bank, Princeton, N.J.

[*] Notice: The portion of the term of this patent subsequent to Feb. 10, 2004 has been disclaimed.

[21] Appl. No.: 12,051

[22] Filed: Feb. 6, 1987

Related U.S. Application Data

[63] Continuation of Ser. No. 587,568, Mar. 8, 1984, Pat. No. 4,642,768.

[51] Int. Cl.$^4$ .............................................. G06F 15/21
[52] U.S. Cl. .................................... 364/408; 364/300; 364/401
[58] Field of Search ............... 364/400, 401, 402, 406, 364/408, 200 MS File, 900 MS File, 300, 715, 716, 735

[56] References Cited

U.S. PATENT DOCUMENTS

| | | | |
|---|---|---|---|
| 4,055,757 | 10/1977 | Tillman et al. | 364/715 |
| 4,232,367 | 11/1980 | Youden et al. | 364/408 |
| 4,346,442 | 8/1982 | Musmanno | 364/408 |
| 4,412,287 | 10/1983 | Braddock, III | 364/408 |
| 4,486,849 | 12/1984 | Harigaya et al. | 364/715 |
| 4,566,066 | 1/1986 | Towers | 364/408 |

FOREIGN PATENT DOCUMENTS 0182450  5/1986  European Pat. Off. .
1390397  4/1975  United Kingdom .

OTHER PUBLICATIONS

Diller, N. J., "The Computer and Plan Administration . . . How Merrill Lynch Tackles the Problem for its Pension Fund", *Pension World*, vol. 12, No. 8, Aug. 1976, 9–12, 57–58.

Bodie, Z., "An Innovation for Stable Real Retirement Income", *Journal of Portfolio Management*, vol. 7, No. 1, Fall 1980, 5–13.

Gazis, D. C. "Real Estate Investment Analysis System", *IBM Tech. Discl. Bul.*, vol. 13, No. 11, Apr. 1971, 3274–5.

Gaines et al., "Minicomputers in Security Dealing", *Computer*, vol. 9, No. 9, Sep. 1976, 6–15.

Bach et al., "A Stable Purchasing Power Bond", *American Economic Review*, vol. 31, 1941, 823–25.

Fiske, E. B., "As Tuitions Rise, Colleges Adopt Banks' Role", *New York Times*, Apr. 14, 1986, 1, 14.

Henderson, C., "Forecasting College Costs Through 1988–89", American Council on Education Policy Brief, Jan. 1986.

Minard, L., "The CRIBs Age", *Forbes*, Nov. 18, 1985, 38–39.

Schwartz, J., "Pay Now, Learn Later", *Newsweek*, Apr. 7, 1986, 76.

*Primary Examiner*—Jerry Smith
*Assistant Examiner*—Clark A. Jablon
*Attorney, Agent, or Firm*—Laurence S. Rogers; Jeffrey H. Ingerman

[57] ABSTRACT

Methods and apparatus for funding a future liability by means of an insurance investment program. The system estimates the expected cost of the liability when the liability is expected to occur and computes the present value of each unit of insurance needed to yield that expected cost at maturity. The system also aids the insurance fund manager in making decisions regarding investment of fund assets in order to meet present and future obligations of the fund.

52 Claims, 3 Drawing Figures

METHODS AND APPARATUS FOR FUNDING FUTURE LIABILITY OF UNCERTAIN COST

CROSS-REFERENCE TO RELATED APPLICATION

This application is a continuation of copending U.S. patent application Ser. No. 587,568, filed Mar. 8, 1984, now U.S. Pat. No. 4,642,768.

BACKGROUND OF THE INVENTION

This invention relates to methods and apparatus for implementing and administering an insurance investment program to fund future liabilities whose present cost is known and whose future cost is unknown but can be projected with some risk factor.

Generally, insurance programs protect against the uncertain need to fund a liability of certain value, for example, the need to replace a car or a home in case of its loss or the need to provide a source of income in case of disability or death. Insurance programs are also used to protect against relatively large liabilities with a relatively small probability of occurrence, for example, personal injury liability.

Recently, investment programs such as mutual funds have come into existence to lower the risk which an individual must assume in investing his assets by combining the assets of many individuals into a common fund invested in a diversity of assets. These programs may be managed to maximize their yield, but they are not managed to provide a yield needed to fund any particular liability. Thus they have no insurance protection aspects.

However, there is no easy way for an investor to fund a relatively certain future liability of uncertain cost, such as the cost of a college education, in a way that also provides insurance protection for meeting that liability.

SUMMARY OF THE INVENTION

In view of the foregoing, it is an object of this invention to provide methods and apparatus for implementing an insurance investment program which provides an investor a future return adequate to fund an uncertain future liability whose cost can be projected on the basis of current cost data and assumptions of the rate of change of that data, and which determines the amount that must be invested in the program to provide the required future return.

It is a more particular object of this invention to provide methods and apparatus for implementing an insurance investment program which provides an investor a future return adequate to pay the cost of a college education for his beneficiary (e.g., a child, grandchild, etc.) in return for a present investment determined on the basis of current college cost data and projections of the rate of increase of college costs.

These and other objects of the invention are accomplished by providing a data processing system which implements an insurance investment program that combines the risk reduction advantages of a mutual fund with the protection advantages of an insurance policy, and moreover provides protection for a future liability of uncertain cost. The system provides for projection of the future cost of a liability of known present cost and discounting the future cost to the charge for an insurance premium to be paid by the investor. The system also provides for the management of the fund of invested premiums so that the yield of the fund at least matches the increase in cost of the insured liability and so that the cash flow from the fund is adequate for funding the program's liabilities at their predetermined maturity dates. The system periodically processes investor transactions to update the program funds asset positions, provides information to the program manager to help him evaluate options for the purchase and sale of assets, and provides reports to the program manager and to the investors regarding income generated by the fund.

Further features of the invention, its nature and various advantages will be more apparent from the accompanying drawing and the following detailed description of an illustrative embodiment of the invention.

DETAILED DESCRIPTION OF THE INVENTION

The data processing system for administering the program comprises a central computer connected to a network of remote point-of-sale stations. In overview, the system operates as follows. The point-of-sale stations serve as the data entry point for customer transactions, including insurance unit purchases, payouts, and redemptions. The point-of-sale stations also serve as an access point by which the salesman can refer to and retrieve data to answer a customer's questions concerning the insurance program to determine the charge to the customer for insurance unit purchases, and to determine the amount to be paid to the customer for insurance unit redemptions and payouts. In addition, the point-of-sale stations store a record of customer transactions which is periodically transmitted to the central office computer.

The central office computer receives and processes the customer transaction data from the multiple point-of-sale stations. Based on the customer transaction data, the data processsng system which operates on the central computer updates the account list and the master file of account data. The central system also provides information to the manager of the investment fund for the program concerning the current purchases, payouts, and redemptions and projected purchases, payouts, and redemptions. The system also provides the investment manager information about how the particular investments available match the projected cash flow requirements of the fund.

The central system creates a report to the investment manager summarizing customer transactions and investment transactions, and an analysis of the projected cash flow needs of the fund compared to the projected income and maturity dates of the fund's investments. In addition, the system creates periodic reports for the customers concerning the current value of their units and the income generated by the program.

Figure 1:
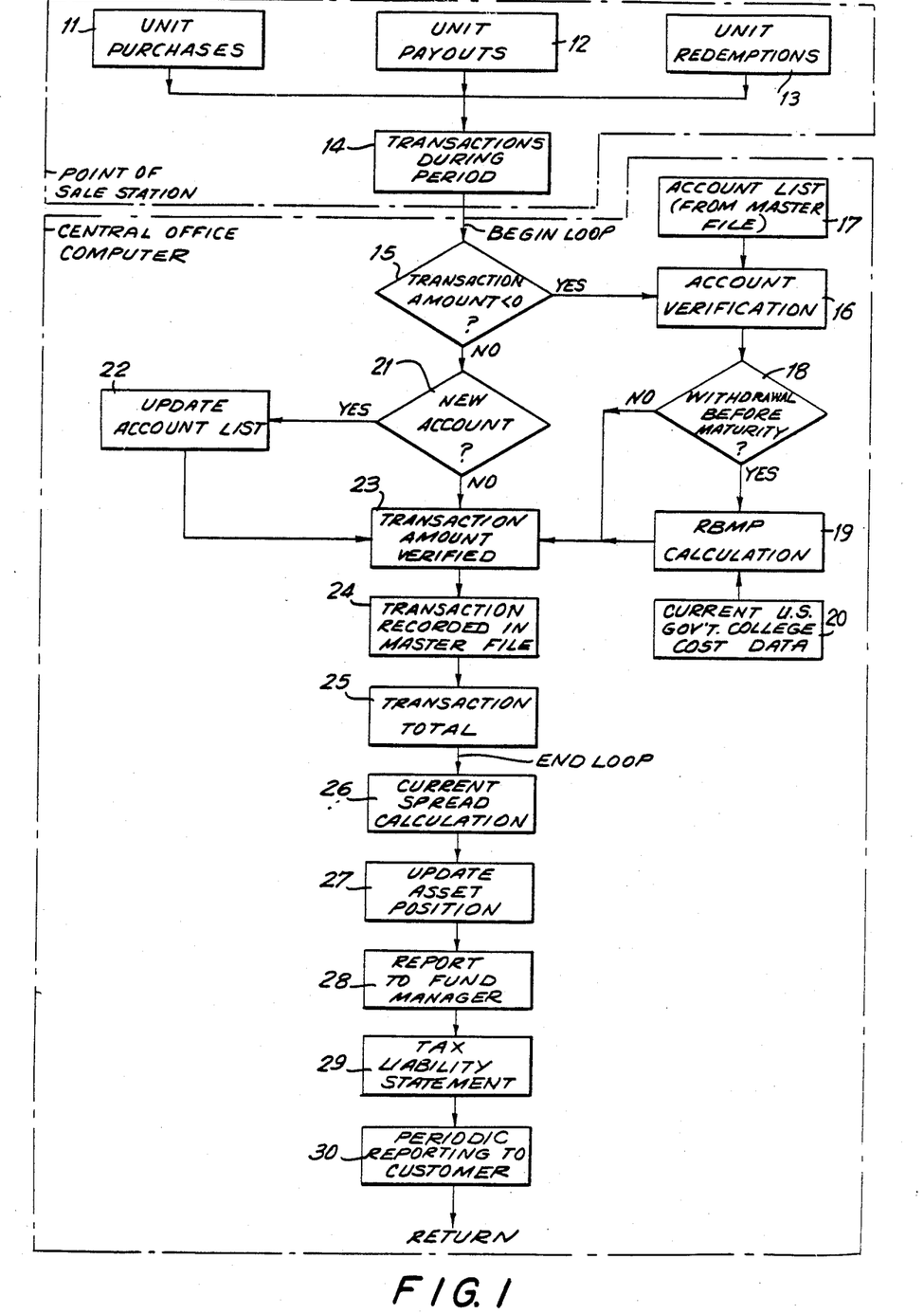
FIG. 1 is a schematic flow chart depicting the data processing methodology and structure in acordance with the principles of the invention.
Figure 2:
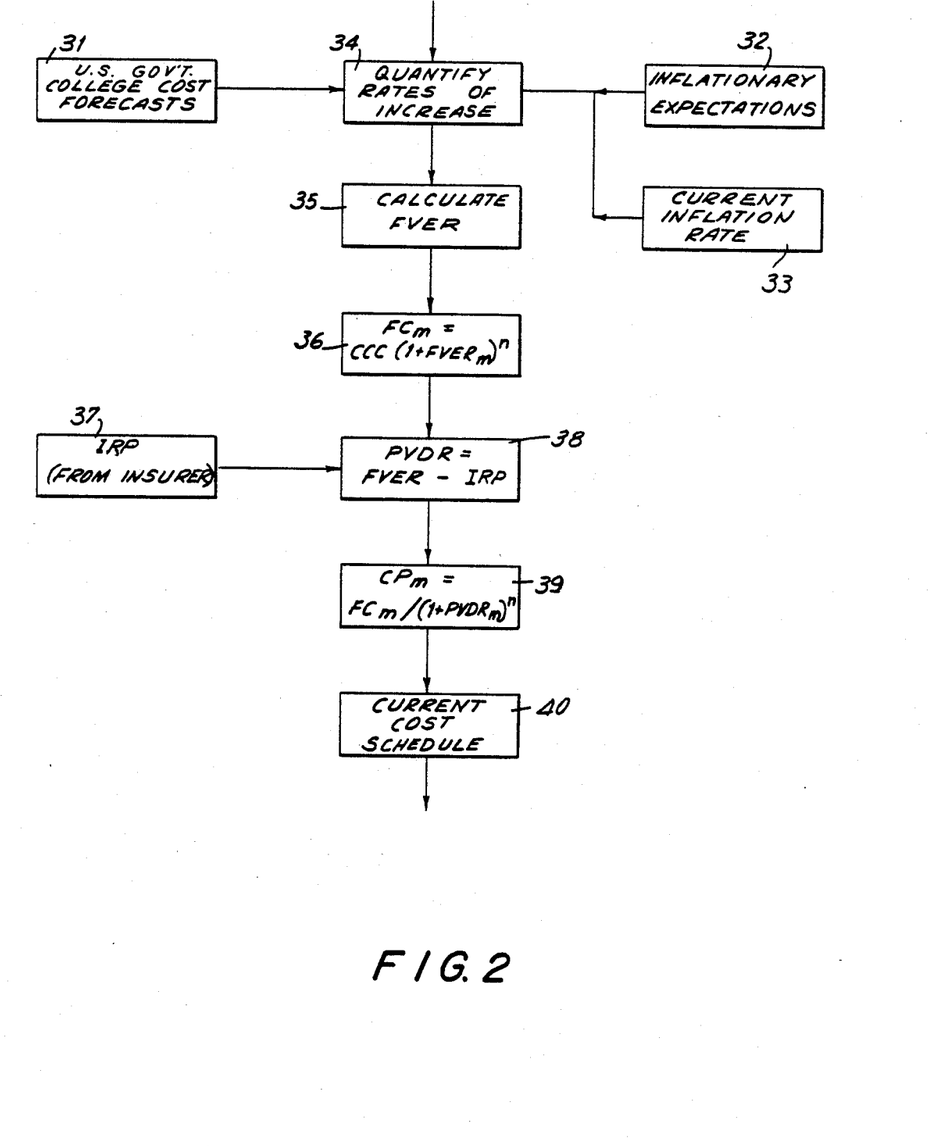
FIG. 2 is a schematic flow chart depicting in more detail the current spread calculation operation represented by block 26 of FIG. 1.
Figure 3:
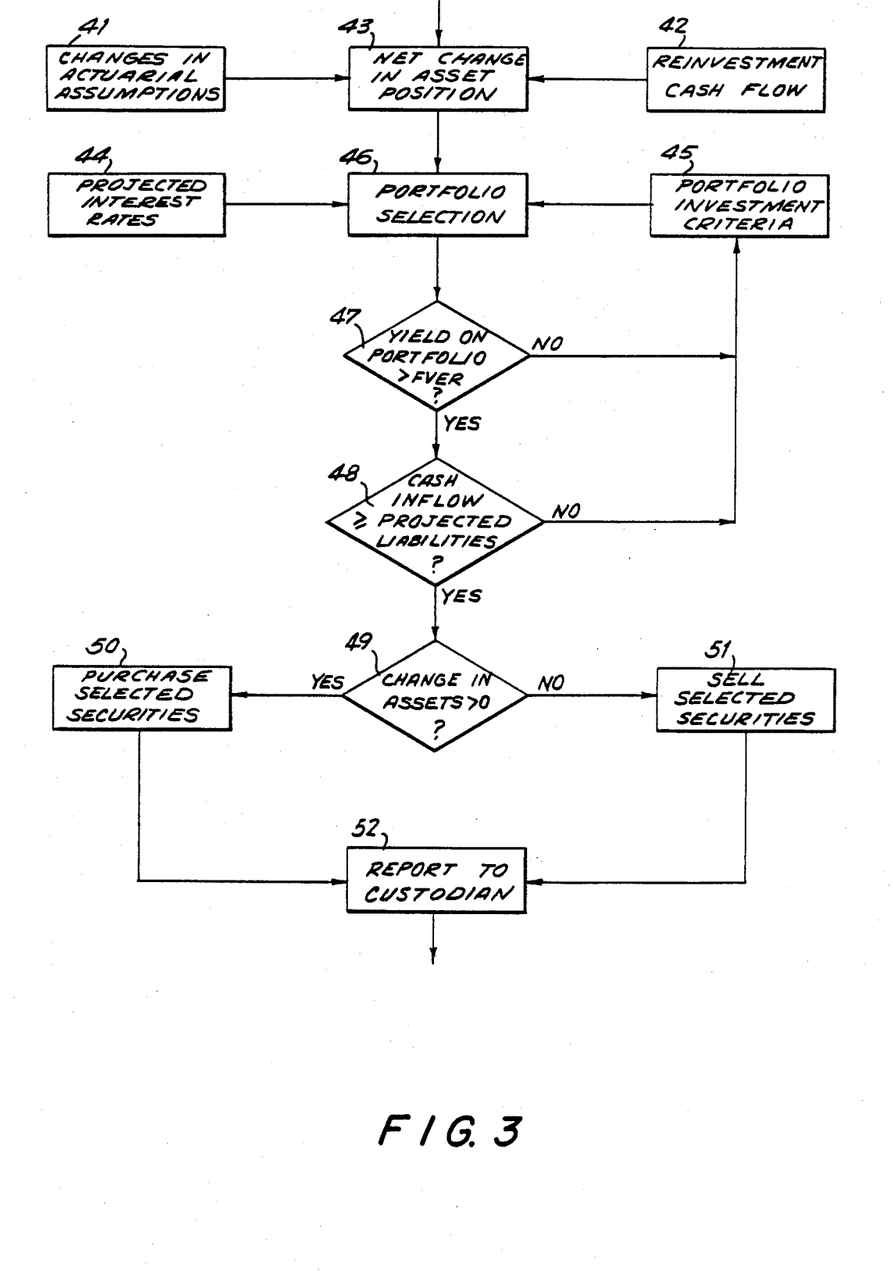
FIG. 3 is a schematic flow chart depicting in more detail the update asset position operation represented by block 27 in FIG. 1.

With the foregoing overview in mind, the detailed operation of the system can best be understood by referring to FIGS. 1-3 which illustrate the system in the context of an insurance investment program for funding the cost of a future college education. Although funding future college education costs is the particular embodiment shown and described herein, it will be apparent to those skilled in the art how the invention can be adapted, within the scope of the invention, to insurance investment programs for funding other future liabilities of uncertain cost.

As ahown in FIG. 1, the customer transaction operations performed at the point-of-sale stations include blocks 11-14. Customer transactions can be purchases, payouts, or redemptions of fund units.

Unit purchase data is entered at block 11, unit payout data is entered at block 12, and unit redemption data is entered at block 13. Each entry includes the customer's name and account number and the transaction amount. The entered transaction data is stored at block 14 for transmission to the central processing facility.

The transaction data accumulated at the point-of-sale stations is transmitted periodically (e.g., daily) to the central processing facility. Alternatively, the data can be transmitted immediately upon entry and accumulated for processing at the central facility.

The data for each incoming transaction is processed individually in a loop beginning with block 15 and ending at block 25 where all transactions in a batch (e.g., a day) are totalled prior to further processing as a group in accordance with block 26 et seq.

The incoming transaction data is first subjected to test 15 which determines whether the transaction is a purchase (NO output) or a redemption (YES output).

If the transaction is a purchase, the system flow passes to test 21 which determines if the purchase is the first transaction in a new account or an additional transaction in an existing account. For new accounts the system flow passes to block 22 which creates a new entry in the account list based on the transaction data.

Transaction data for both new and existing accounts then passes to block 23 which checks the transaction data for possible errors in calculation at the point-of-sale station.

If the transaction is a payout or a withdrawal, data flow moves from test 15 to block 16 where the transaction data is verified to confirm that it is from a valid account. The account information necessary to verify the transaction data is supplied from the account list stored in the system's master file, shown at block 17. Thereafter, the data flow passes to test 18, which determines whether the transaction is a payout (withdrawal at maturity) or a redemption (withdrawal before maturity). Payout transaction data passes to verification block 23. For redemption transactions, the redemption before maturity penalty (RBMP) must be calculated. This is accomplished at block 19. The RBMP calculation is based on the current value of an insurance unit which is a function of the present college cost data. The college cost data is supplied from one of the system's data files shown at block 20. From the RBMP calculation, system flow for redemption transactions also passes to verification block 23 which checks for possible errors made at the point-of-sale station.

From verification block 23, system flow passes to block 24, where each transaction is recorded in the system's master file, and the customer account list data is updated. Thereafter, system flow passes to block 25, where purchase, payout, and redemption transactions are totalled.

Next, system flow passes to block 26, where the current spread calculation is carried out to create an updated schedule of the current charge to customers for insurance units based on the prevailing college cost and inflation rate data. The current spread calculation is explained in greater detail below in relation to FIG. 2. The updated schedule of current charges is transmitted to the point-of-sale stations. There, the schedule is used by the salesmen to provide cost information to customers and to set the cost for unit purchases, unit payouts, and unit redemptions.

System flow then proceeds to block 27 which carries out the update asset position operation to determine what investment transactions should be made in the fund investment portfolio based on current and projected customer transactions. The update asset position operation is explained in greater detail below in relation to FIG. 3. The data processing system advises the fund manager of its determination concerning the net amount of required investment transactions and provides a list of the investments which might be suitable for purchase or sale. Based on this information, the manager can choose the investment transactions to be made and enter the investment transaction data into the system.

After the investment transaction data is entered, system flow passes to block 28, where a report is created for the investment manager which details the changes made during the period, including the transaction totals for the period, the fund assets purchased and sold, the projection of the cash flow requirements for customer transactions, the projection of the cash flow generated from the fund assets, etc.

Next, system flow passes to block 29, where the system peiodically (e.g., annually) prepares a tax liability statement for each customer and for the fund manager. Also, at block 30, the system prepares another periodic report (e.g., quarterly) to provide the customer with current account information.

Referring now to FIG. 2, there is shown a more detailed flow chart for the current spread calculation process corresponding to block 26 of FIG. 1. The current spread calculation creates a schedule of the current charge to customers for insurance units of various maturity dates. The calculation proceeds on the basis of information concerning current college costs, the current inflation rate and the projections for change of the inflation rate, and the risk premium which compensates the fund for assuming the investment risk.

The process starts at block 34 with an evaluation of several variables which contribute to the increase in college costs. Data concerning the current inflation rate (block 33) and the expected changes in the inflation rate (block 32) are entered into the system by the fund manager. Data concerning current college costs and the rate of increase of college costs (e.g., in the United States of America, U.S. Department of Education College Cost Forecasts) is entered into the system (block 31). The system quantifies and combines this data (block 34) and calculates a future value escalation rate (FVER) for each maturity offered (block 35) and to fix current college costs (CCC). Flow then passes to block 36, which calculates the future college cost at each maturity ($FC_m$) by escalating the current college cost (CCC) at the FVER rate according to the relation $FC_m = CCC(1 + FVER_m)^n$, where n is the number of years to maturity. This future value is then discounted at a rate, the present value discount rate (PVDR), which represents the estimated inflation rate (FBER) minus the insurer's risk premium (IRP). The insurer's risk premium rate is entered by the fund manager (block 37) and can be adjusted to compensate for market volatility or other factors which affect the investment risk involved. The calculation of the PVDR is accomplished at block 38. Then, at block 39, the future cost for each maturity is discounted to the present value using the PVDR to determine the current price per insurance unit for each maturity ($CP_m$) according to the relation $CP_m = FC_m(1+PVDR_m)^{-n}$, where n is the number of years to maturity.

Finally, the $CP_m$ values are assembled into a current cost schedule at block 40 and the current cost schedule is transmitted to the point of sale stations. At this point the current spread calculation is completed and control is then transferred to the update asset function corresponding to block 27 in FIG. 1 which will now be discussed in more detail.

Referring now to FIG. 3, there is shown a more detailed schematic flow chart for the update asset position function (block 27). This operation enables the fund manager to evaluate changes in the fund investment portfolio to invest net income, to meet redemption and payout obligations, and to structure the investment portfolio to provide for funding future obligations while maximizing return on the portfolio.

First, the net change in the fund's asset position is determined at block 43. This determination is made by combining the totalled customer transaction data (generated at block 25), actuarial data (block 41), and reinvestment cash flow data (block 42). The actuarial data is entered into the system by the fund manager based on information concerning the projected rate of increase of college costs, basic economic data which affect those costs, and the redemption rate of insurance units. The reinvestment cash flow data is generated by the system and includes income realized from the fund's investments, e.g., dividends or bond coupon payments, plus the principal amounts realized from securities which matured or were sold during the period.

The result of the net change in asset position data is sent to block 46 for selection of the investments to be purchased or sold. Also provided at block 46 is data concerning projected interest rate levels (block 44), investment criteria entered by the fund manager and data from the system's data base concerning the range of securities available for purchase or sale (block 45). The system selects a list of securities which meet these various criteria and displays the options to the fund manager. The fund manager enters his selection of investment transactions into the system.

Thereafter, flow passes to two tests which evaluate the changed fund portfolio. First, test 47 determines whether the yield on the new portfolio exceeds FVER, i.e., whether the rate of return on investments is enough to match the expected rate of increase in liabilities. Second, test 48 determines whether the cash inflow from the new portfolio exceeds the projected liabilities, i.e., whether the return of interest and principal from maturing securities matches the fund liabilities due to payouts on maturing insurance units and expected redemption before maturity of insurance units. Only if the fund manager's selections pass both tests are the investment transactions carried out. Otherwise, control returns to the portfolio selection step (block 46) via block 45 at which the problems with the selected transactions are displayed to the fund manager so that he can revise his criteria and make a new selection of investments. The selection/evaluation loop (46, 47, 48, 45) continues until the fund manager is satisfied that the return on the portfolio is maximized and the portfolio meets the tests imposed by the system.

Then, flow passes to test 49 to determine whether the selected transactions are purchases or sales and to blocks 50 and 51 to effect orders for purchase or sale of the selected securities. At block 52, a report of the securities purchased or sold is generated. At that point, the update asset function is completed and system flow passes to the report generating functions at blocks 28, 29, and 30 discussed earilier with reference to FIG. 1.

What is claimed is:

1. A data processing system for administering a program to provide a future return adequate to meet payouts for funding the uncertain cost of a service or commodity at a future date, which determines payments required for participation in the program and manages a portfolio of assets purchased with the participation payments, said system comprising:

means for determining the payment required for participation in the program based on the cost of the service or commodity at time of payment, data concerning the expected time rate of change of the cost of said service or commodity, and the time period from the present to said future date;

means for entering participation payment data into the data processing system;

asset position list means for storing an asset position list including information concerning the portfolio of assets purchased with the participation payments;

means for periodically processing said participation payment data to determine the total of said participation payment data for a period for which said periodic processing is performed;

means responsive to said total participation payment data and to information from said asset position list for providing portfolio management data so that assets can be selectively purchased or sold to provide that the cash flow from the portfolio is adequate for funding program payouts and to provide that the yield of the portfolio at least matches the expected time rate of change from the present to said future date of the present cost of the service or commodity; and means for generating a management report including said portfolio management data and said information in said asset position list.

2. The data processing system of claim 1, further comprising means for entering the selected asset purchase and sale transaction data, to update the asset position list.

3. The data processing system of claim 1, wherein the means for determining the payment required for participation in the program comprises:

means for determining a future value escalation rate in response to information concerning the expected time rate of change of the cost of the service or commodity;

means for projecting the future cost of the service or commodity based on the current cost and the future value escalation rate; and means for discounting the future cost to a rpesent value based on at least the future value escalation rate to determine a current price for the participation payment.

4. The data processing system of claim 3 wherein said discounting means discounts said future cost further based upon a risk rate.

5. The data processing system of claim 3, wherein the means for providing portfolio management data comprises:

means for determining the net change in asset position in response to information concerning the net amount of transactions, reinvestment cash flow from the portfolio, and actuarial data; and means responsive to the net change in asset position determination and to data inputs concerning investment criteria and projected interest rates for selecting assets to be purchased or sold, and for evaluating the effect of the selected asset purchases or sales on the portfolio to identify selections which cause at least one of (a) the yield of the portfolio to be less than the future value escalation rate, and (b) the cash inflow from the portfolio to be less than the total of projected program payouts.

6. The data processing system of claim 1, further comprising account list means for storing an account list including current information for each participant account.

7. A data processing method for administering a program to provide a future return adequate to meet payouts for funding the uncertain cost of a service or commodity at a future date, which determines payments required for participation in the program and manages a portfolio of assets purchased with the participation payments, said method comprising the steps of:

determining the payment required for participation in the program based on the cost of the service or commodity at time of payment, data concerning the expected time rate of change of the cost of said service or commodity, and the time period from the present to said future date;

entering participation payment data;

storing an asset position list including information concerning the portfolio of assets purchased with the participation payments;

periodically processing said participation payment data to determine the total of said participation payment data for a period for which said periodic processing is performed;

providing portfolio management data in response to said total participation payment data and to information from said asset position list, so that assets can be selectively purchased or sold to provide that the cash flow from the portfolio is adequate for funding program payments and to provide that the yield of the portfolio at least matches the expected time rate of change from the present to said future date of the present cost of the service or commodity; and generating a management report including said portfolio management data and said information in said asset position list.

8. The data processing method of claim 7, wherein the step of determining the payment required for participation in the program comprises the steps of:

determining a future value escalation rate in response to information concerning the expected time rate of change of the cost of the service or commodity;

projecting the future cost of the service or commodity based on the current cost and the future value escalation rate; and discounting the future cost to a present value based on at least the future value escalation rate to determine a current price for the participation payment.

9. The data processing method of claim 8 wherein said discounting step comprises discounting said future cost further based upon a risk rate.

10. The data processing method of claim 8, wherein the step of providing portfolio management data comprises the steps of:

determining the net change in asset position in response to information concerning the net amount of transactions, reinvestment cash flow from the portfolio, and actuarial data; and responsive to the net change in asset position determination and to data inputs concerning investment criteria and projected interest rates, selecting assets to be purchased or sold, and evaluating the effect of the selected asset purchases or sales on the portfolio to identify selections which cause at least one of (a) the yield of the portfolio to be less than the future value escalation rate, and (b) the cash inflow from the portfolio to be less than the total of projected program payouts.

11. The data processing method of claim 7, further comprising entering the selected asset purchase and sale transaction date, to update the asset position list.

12. The data processing method of claim 7, further comprising storing an account list including current information for each participant account.

13. A data processing system for administering a program to provide a future return for meeting payouts, which determines payments required for participation in the program and manages a portfolio of assets purchased with the participation payments, said system comprising:

means for determining the payment required for participation in the program based on the cost of a selected service or commodity at time of payment, data concerning the expected time rate of change of the cost of said service or commodity, and the time period from the present to a preselected future date;

means for entering participation payment data into the data processing system;

asset position list means for storing an asset position list including information concerning the portfolio of assets purchased with the participation payments;

means for periodically processing said participation payment data to determine the total of said participation payment data for a period for which said periodic processing is performed;

means responsive to said total participation payment data and to information from said asset position list for providing portfolio management data so that assets can be selectively purchased or sold to provide that the cash flow from the portfolio is adequate for funding program payouts and to provide that the yield of the portfolio at least matches the expected time rate of change from the present to said future date of the present cost of the service or commodity, whereby said future return is adequate to fund the uncertain cost of the service or commodity at said future date; and means for generating a management report including said portfolio management data and said information in said asset position list.

14. The data processing system of claim 13, further comprising means for entering the selected asset purchase and sale transaction data, to update the asset position list.

15. The data processing system of claim 13, wherein the means for determining the payment required for participation in the program comprises:
   means for determining a future value escalation rate in response to information concerning the expected time rate of change of the cost of the service or commodity;
   means for projecting the future cost of the service or commodity based on the current cost and the future value escalation rate; and
   means for discounting the future cost to a present value based on at least the future value escalation rate to determine a current price for the participation payment.

16. The data processing system of claim 15 wherein said discounting means discounts said future costs further based upon a risk rate.

17. The data processing system of claim 15, wherein the means for providing portfolio management data comprises:
   means for determining the net change in asset position in response to information concerning the net amount of transactions, reinvestment cash flow from the portfolio, and actuarial data; and
   means responsive to the net change in asset position determination and to data inputs concerning investment criteria and projected interest rates for selecting assets to be purchased or sold, and for evaluating the effect of the selected asset purchases or sales on the portfolio to identify selections which cause at least one of (a) the yield of the portfolio to be less than the future value escalation rate, and (b) the cash inflow from the portfolio to be less than the total of projected program payouts.

18. The data processing system of claim 13, further comprising account list means for storing an account list including current information for each participant account.

19. A data processing method for administering a program to provide a future return for meeting payouts, which determines payments required for participation in the program and manages a portfolio of assets purchased with the participation payments, said method comprising the steps of:
   determining the payment required for participation in the program based on the cost of a selected service or commodity at time of payment, data concerning the expected time rate of change of the cost of said service or commodity, and the time period from the present to a preselected future date;
   entering participation payment data;
   storing an asset position list including information concerning the portfolio of assets purchased with the participation payments;
   periodically processing said participation payment data to determine the total of said participation payment data for a period for which said periodic processing is performed;
   providing portfolio management data in response to said total participation payment data and to information from said asset position list, so that assets can be selectively purchased or sold to provide that the cash flow from the portfolio is adequate for funding program payments and to provide that the yield of the portfolio at least matches the expected time rate of change from the present to said future date of the present cost of the service or commodity, whereby said future return is adequate to fund the uncertain cost of the service or commodity at said future date; and
   generating a management report including said portfolio management data and said information in said asset position list.

20. The data processing method of claim 19, wherein the step of determining the payment required for participation in the program comprises the steps of:
   determining a future value escalation rate in response to information concerning the expected time rate of change of the cost of the service or commodity;
   projecting the future cost of the service or commodity based on the current cost and the future value escalation rate; and
   discounting the future cost to a present value based on at least the future value escalation rate to determine a current price for the participation payment.

21. The data processing method of claim 20 wherein said discounting step comprises discounting said future cost further based upon a risk rate.

22. The data processing method of claim 20, wherein the steps of providing portfolio management data comprises the steps of:
   determining the net change in asset position in response to information concerning the net amount of transactions, reinvestment cash flow from the portfolio, and actuarial data; and
   responsive to the net change in asset position determination and to data inputs concerning investment criteria and projected interest rates, selecting assets to be purchased or sold, and evaluating the effect of the selected asset purchases or sales on the portfolio to identify selections which cause at least one of (a) the yield of the portfolio to be less than the future value escalation rate, and (b) the cash inflow from the portfolio to be less than the total of projected program payouts.

23. The data processing method of claim 19, further comprising entering the selected asset purchase and sale transaction data, to update the asset position list.

24. The data processing method of claim 19, further comprising storing an account list including current information for each participant account.

25. A data processing system for administering a program to provide a future return adequate to meet payouts for funding the uncertain cost of a service or commodity at a future date, which determines payments required for participation in the program and manages a portfolio of assets purchased with the participation payments, said system comprising:
   means for determining the payment required for participation in the program based on the cost of the service or commodity at time of payment, data concerning the expected time rate of change of the cost of said service or commodity, and the time period from the present to said future date;
   means for entering participation payment data into the data processing system;
   account list means for storing an account list including current information for each participant account;

asset position list means for storing an asset position list including information concerning the portfolio of assets purchased with the participation payments;

means for periodically processing said participation payment data to determine the total of said participation payment data for a period for which said periodic processing is performed;

means for determining at a date intermediate said present and future dates a value for each participant account as a function of the cost of said service or commodity at time of payment of said participation payment, the rate of change from the present to said intermediate date of the present cost of the service or commodity, and time elapsed from the present to said intermediate date;

means responsive to said total participation payment data and to information from said asset position list for providing portfolio management data so that assets can be selectively purchased or sold to provide that the cash flow from the portfolio is adequate for funding program payouts and to provide that the yield of the portfolio at least matches the expected time rate of change from the present to said future date of the present cost of the service or commodity; and means for generating a management report including said portfolio management data and said information in said asset position list.

26. The data processing system of claim 25, further comprising means for entering the selected asset purchase and sale transaction data, to update the asset position list.

27. The data processing system of claim 25, wherein the means for determining the payment required for paritcipation in the program comprises:

means for determining a future value escalation rate in response to information concerning the expected time rate of change of the cost of the service or commodity;

means for projecting the future cost of the service or commodity based on the current cost and the future value escalation rate; and means for discounting the future cost to a present value based on at least the future value escalation rate to determine a current price for the participation payment.

28. The data processing system of claim 27 wherein said discounting means discounts said future cost further based upon a risk rate.

29. The data processing system of claim 27, wherein the means for providing portfolio management data comprises:

means for determining the net change in asset position in response to information concerning the net amount of transactions, reinvestment cash flow from the portfolio, and actuarial data; and means responsive to the net change in asset position determination and to data inputs concerning investment criteria and projected interest rates for selecting assets to be purchased or sold, and for evaluating the effect of the selected asset purchases or sales on the portfolio to identify selections which cause at least one of (a) the yield of the portfolio to be less than the future value escalation rate, and (b) the cash inflow from the portfolio to be less than the total of projected program payouts.

30. A data processing method for administering a program to provide a future return adequate to meet payouts for funding the uncertain cost of a service or commodity at a future date, which determines payments required for participation in the program and manages a portfolio of assets purchased with the participation payments, said method comprising the steps of:

determining the payment required for participation in the program based on the cost of the service or commodity at time of payment, data concerning the expected time rate of change of the cost of said service or commodity, and the time period from the present to said future date;

entering participation payment data;

storing an account list including current information for each participant account;

storing an asset position list including information concerning the portfolio of assets purchased with the participation payments;

periodically processing said participation payment data to determine the total of said participation payment data for a period for which said periodic processing is performed;

determining at a date intermediate said present and future dates a value for each participant account as a function of the cost of said service or commodity at time of payment of said participation payment, the rate of change from the present to said intermediate date of the present cost of the service or commodity, and time elapsed from the present to said intermediate date;

providing portfolio management data in response to said total participation payment data and to information from said asset position list, so that assets can be selectively purchased or sold to provide that the cash flow from the portfolio is adequate for funding program payments and to provide that the yield of the portfolio at least matches the expected time rate of change from the present to said future date of the present cost of the service or commodity; and generating a management report including said portfolio management data and said information in said asset position list.

31. The data processing method of claim 30, further comprising entering the selected asset purchase and sale transaction data, to update the asset position list.

32. The data processing method of claim 30, wherein the step of determining the payment required for participation in the program comprises the steps of:

determining a future value escalation rate in response to information concerning the expected time rate of change of the cost of the service or commodity;

projecting the future cost of the service or commodity based on the current cost and the future value escalation rate; and discounting the future cost to a present value based on at least the future value escalation rate to determine a current price for the participation payment.

33. The data processing method of claim 32 wherein said discounting step comprises discounting said future cost further based upon a risk rate.

34. The data processing method of claim 32, wherein the step of providing portfolio management data comprises the steps of:

determining the net change in asset position in response to information concerning the net amount of transactions, reinvestment cash flow from the portfolio, and actuarial data; and responsive to the net change in asset position determination and to data inputs concerning investment criteria and projected interest rates, selecting assets to be purchased or sold, and evaluating the effect of the selected asset purchases or sales on the portfolio to identify selections which cause at least one of (a) the yield of the portfolio to be less than the future value escalation rate, and (b) the cash inflow from the portfolio to be less than the total of projected program payouts.

35. A data processing system for administering a program to provide a future return adequate to meet payouts for funding the uncertain cost of a service or commodity at a future date, which determines payments required for participation in the program and manages a portfolio of assets purchased with the participation payments, said system comprising:

means for determining the payment required for participation in the program based on the cost of the service or commodity at time of payment, data concerning the expected time rate of change of the cost of said service or commodity, and the time period from the present to said future date;

means for entering participation payment data into the data processing system;

account list means for storing an account list including current information for each participant account;

asset position list means for storing an asset position list including information concerning the portfolio of assets purchased with the participation payments;

means for periodically processing said participation payment data to determine the total of said participation payment data for a period for which said periodic processing is performed;

means for determining at a date intermediate said present and future dates value data for each participant account as a function of the cost of said service or commodity at time of payment of said participation payment, the rate of change from the present to said intermediate date of the present cost of the service or commodity, and time elapsed from the present to said intermediate date;

means responsive to said total participation payment data, to said participant account value data, and to information from said asset position list for providing portfolio management data so that assets can be selectively purchased or sold to provide that the cash flow from the portfolio is adequate for funding program payouts and to provide that the yield of the portfolio at least matches the expected time rate of change from the present to said future date of the present cost of the service or commodity; and means for generating a management report including said portfolio management data and said information in said asset position list.

36. The data processing system of claim 35, further comprising means for entering the selected asset purchase and sale transaction data, to update the asset position list.

37. The data processing system of claim 35, wherein the means for determining the payment required for participation in the program comprises:

means for determining a future value escalation rate in response to information concerning the expected time rate of change of the cost of the service or commodity;

means for projecting the future cost of the service or commodity based on the current cost and the future value escalation rate; and means for disconnecting the future cost to a present value based on at least the future value escalation rate to determine a current price for the participation payment.

38. The data processing system of claim 37 wherein said discounting means discounts said future cost further based upon a risk rate.

39. The data processing system of claim 37, wherein the means for providing portfolio management data comprises:

means for determining the net change in asset position in response to information concerning the net amount of transactions, reinvestment cash flow from the portfolio, and actuarial data; and means responsive to the net change in asset position determination and to data inputs concerning investment criteria and projected interest rates for selecting assets to be purchased or sold, and for evaluating the effect of the selected asset purchases or sales on the portfolio to identify selections which cause at least one of (a) the yield of the portfolio to be less than the future value escalation rate, and (b) the cash inflow from the portfolio to be less than the total of projected program payouts.

40. A data processing method for administering a program to provide a future return adequate to meet payouts for funding the uncertain cost of a service or commodity at a future date, which determines payments required for participation in the program and manages a portfolio of assets purchased with the participation payments, said method comprising the steps of:

determining the payment required for participation in the program based on the cost of the service or commodity at time of payment, data concerning the expected time rate of change of the cost of said service or commodity, and the time period from the present to said future data;

entering participation payment data;

storing an account list including current information for each participant account;

storing an asset position list including information concerning the portfolio of assets purchased with the participation payments;

periodically processing said participation payment data to determine the total of said participation payment data for a period for which said periodic processing is performed;

determining at a date intermediate said present and future dates value data for each participant account as a function of the cost of said service or commodity at time of payment of said participation payment, the rate of change from the present to said intermediate date of the present cost of the service or commodity, and time elapsed from the present to said intermediate date;

providing portfolio management data in response to said total participation payment data, to said participant account value data, and to information from said asset position list, so that assets can be selectively purchased or sold to provide that the cash flow from the portfolio is adequate for funding program payments and to provide that the yield of the portfolio at least matches the expected time rate of change from the present to said future date of the present cost of the service or commodity; and generating a management report including said portfolio management data and said informatoin in said asset position list.

41. The data processing method of claim 40, further comprising entering the selected asset purchase and sale transaction data, to update the asset position list.

42. The data processing method of claim 40, wherein the steps of determining the payment required for participation in the program comprises the steps of:
determining a future value escalation rate in response to information concerning the expected time rate of change of the cost of the service or commodity;
projecting the future cost of the service or commodity based on the current cost and the future value escalation rate; and
discounting the future cost to a present value based on at least the future value escalation rate to determine a current price for the participation payment.

43. The data processing method of claim 42 wherein said discounting step comprises discounting said future cost further based upon a risk rate.

44. The data processing method of claim 42, wherein the step of providing portfolio management data comprises the steps of:
determining the net change in asset position in response to information concerning the net amount of transactions, reinvestment cash flow from the portfolio, and actuarial data; and
responsive to the net change in asset position determination and to data inputs concerning investment criteria and projected interest rates, selecting assets to be purchased or sold, and evaluating the effect of the selected asset purchases or sales on the portfolio to identify selections which cause at least one of (a) the yield of the portfolio to be less than the future value escalation rate, and (b) the cash inflow from the portfolio to be less than the total of projected program payouts.

45. A data processing system for administering a program to provide a future return adequate to meet payouts for funding the uncertain cost of a service or commodity at a future date, which determines payments required for participation in the program and manages a portfolio of assets purchased with the participation payments, said system comprising:
means for determining the payment required for participation in the program based on the cost of the service or commodity at time of payment, data concerning the expected time rate of change of the cost of said service or commodity, and the time period from the present to said future date;
means for entering participation payment data into the data processing system;
asset position list means for storing an asset position list including information concerning the portfolio of assets purchased with the participation payments;
means for periodically processing said participation payment data to determine the total of said participation payment data for a period for which said periodic processing is performed;
means responsive to said total participation payment data and to information from said asset position list for providing portfolio management data so that assets can be selectively purchased or sold to provide that the yield of the portfolio and the cash flow from the portfolio are adequate for funding program payouts; and
means for generating a management report including said portfolio management data and said information in said asset position list.

46. The data processing system of claim 45, further comprising means for entering the selected asset purchase and sale transaction data, to update the asset position list.

47. The data processing system of claim 45, wherein the means for providing portfolio management data comprises:
means for determining the net change in asset position in response to information concerning the net amount of transactions, reinvestment cash flow from the portfolio, and actuarial data; and
means responsive to the net change in asset position determination and to data inputs concerning investment criteria and projected interest rates for selecting assets to be purchased or sold, and for evaluating the effect of the selected asset purchases or sales on the portfolio to identify selections which cause cash inflow from the portfolio to be less than the total of projected program payouts.

48. The data processing system of claim 45, further comprising account list means for storing an account list including current information for each participant account.

49. A data processing method for administering a program to provide a future return adequate to meet payouts for funding the uncertain cost of a service or commodity at a future date, which determines payments required for participation in the program and manages portfolio of assets purchased with the participation payments, said method comprising the steps of:
determining the payment required for participation in the program based on the cost of the service or commodity at time of payment, data concerning the expected time rate of change of the cost of said service or commodity, and the time period from the present to said future date;
entering participation payment data;
storing an asset position list including information concerning the portfolio of assets purchased with the participation payments;
periodically processing said participation payment data to determine the total of said participation payment data for a peiod for which said periodic processing is performed;
providing portfolio management data in response to said total participation payment data and to information from said asset position list, so that assets can be selectively purchased or sold to provide that the yield of the portfolio and the cash flow from the portfolio are adequate for funding program payouts; and
generating a management report including said portfolio management data and said information in said asset position list.

50. The data processing method of claim 49, further comprising entering the selected asset purchase and sale transaction data, to update the asset position list.

51. The data processing method of claim 49, further comprising storing an account list including current information for each participant account.

52. The data processing method of claim 49, wherein the step of providing portfolio management data comprises the steps of:

determining the net change in asset position in response to information concerning the net amount of transactions, reinvestment cash flow from the portfolio, and actuarial data; and responsive to the net change in asset position determination and to data inputs concerning investment criteria and projected interest rates, selecting assets to be purchased or sold, and evaluating the effect of the selected asset purchases or sales on the portfolio to identify selections which cause cash inflow from the portfolio to be less than the total of projected program payouts.

* * * * *

UNITED STATES PATENT AND TRADEMARK OFFICE
CERTIFICATE OF CORRECTION

PATENT NO. : 4,722,055
DATED : January 26, 1988
INVENTOR(S) : Peter A. Roberts

It is certified that error appears in the above-identified patent and that said Letters Patent is hereby corrected as shown below:

Column 2, line 51, "processng" should read -- processing --.

Column 4, line 36, "peiodically" should read -- periodically --.

Column 6, line 14, "eariler" should read -- earlier --.

Column 6, Claim 3, line 67, "rpesent" should read -- present --.
Column 14, Claim 37, line 8, "disconnecting" should read -- discounting --.
Column 14, Claim 40, line 44, "data;" should read -- date; --.
Column 15, Claim 40, line 6, "informatoin" should read -- information --.
Column 16, Claim 49, line 51, "peiod" should read -- period --.

Signed and Sealed this

Thirty-first Day of January, 1989

*Attest:*

DONALD J. QUIGG

*Attesting Officer*     *Commissioner of Patents and Trademarks*